United States Patent [19]

Ono et al.

[11] Patent Number: 4,541,301
[45] Date of Patent: Sep. 17, 1985

[54] STEERING WHEEL

[75] Inventors: Satoshi Ono; Hiroshi Sugita; Tetsushi Hiramitsu, all of Aichi, Japan

[73] Assignee: Toyoda Gosei Co., Ltd., Nishikasugai, Japan

[21] Appl. No.: 641,486

[22] Filed: Aug. 16, 1984

[30] Foreign Application Priority Data

Aug. 22, 1983 [JP] Japan .............................. 58-152781
Sep. 14, 1983 [JP] Japan .......................... 58-142920[U]

[51] Int. Cl.⁴ ............................................. B62D 1/04
[52] U.S. Cl. .................................. 74/484 R; 74/552; 180/78; 200/61.54
[58] Field of Search ............... 74/552, 484 R; 180/78; 200/61.54, 61.55

[56] References Cited

U.S. PATENT DOCUMENTS

| 2,075,288 | 3/1937 | Jay ........................................ 74/552 |
| 2,622,690 | 12/1952 | Barenyi ................................. 74/552 |
| 4,409,584 | 10/1983 | Arima et al. ......................... 180/78 |
| 4,485,371 | 11/1984 | Yamada et al. ....................... 74/552 |

FOREIGN PATENT DOCUMENTS

| 66774 | 9/1957 | France ................................. 74/552 |
| 49-17167 | 4/1974 | Japan . |
| 110542 | 7/1982 | Japan .................................... 180/78 |

Primary Examiner—Kenneth J. Dorner
Attorney, Agent, or Firm—Cushman, Darby & Cushman

[57] ABSTRACT

A steering wheel includes a column, a steering shaft extending through the column, a spoke mounted on the steering shaft, a steering ring supported on the spoke, a pad mounted on the steering shaft in front of the spoke, and a helical member interconnecting the pad and the column to fix the pad nonrotatably with respect to the column and helically coiled as a number of turns which is greater than the maximum number of rotations of the steering ring, the helical member having a portion extending across the spoke.

7 Claims, 8 Drawing Figures

FIG.7

STEERING WHEEL

BACKGROUND OF THE INVENTION

1. Field of the Invention

The present invention relates to a steering wheel of the type in which a pad will not be turned when the steering wheel is turned, and more particularly to a mechanism for keeping the pad nonrotatable.

2. Description of the Prior Art

One known type of steering wheel with a nonrotatable pad includes a pair of coacting planetary gear mechanisms disposed on a pad and a column, respectively, with a boss plate interposed therebetween for holding a pad against rotation.

The planetary gear mechanisms however have a large number of parts such as gears, shafts, bearings and the like, and are complex in structure, with the result that they cannot be assembled with ease and are costly to manufacture. Another problem that cannot easily be overcome is that the pad is subjected to wobbles due to backlashes between planet gears and sun gears and difficulty experienced in centering the sun gears with respect to each other.

SUMMARY OF THE INVENTION

It is an object of the present invention to provide a steering wheel which is constructed of a reduced number of parts, simple in construction, can be assembled with ease, manufactured less costly, and has a pad that will suffers substantially no wobbling or backlashes.

Another object of the present invention is to provide a steering wheel capable of reliably preventing a pad from swinging or wobbling under an external force applied so that the driver will not feel uneasy about the pad and the high-grade quality of the steering wheel will not be impaired.

Still another object of the present invention is to provide a steering wheel requiring substantially no installation space for an electric connector mechanism so that the overall steering wheel will not be large in size due to the electric connector mechanism.

According to the present invention, there is provided a steering wheel comprising a column, a steering shaft extending through the column, a spoke mounted on the steering shaft, a steering ring supported on the spoke, a pad mounted on the steering shaft in front of the spoke, and a helical member interconnecting the pad and the column to fix the pad nonrotatably with respect to the column and helically coiled as a number of turns which is greater than the maximum number of rotations of the steering ring, the helical member having a portion extending across the spoke.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 7 is an enlarged fragmentary cross-sectional view of the steering wheel shown in FIG. 6.

DESCRIPTION OF THE PREFERRED EMBODIMENTS

A steering wheel according to a first embodiment of the present invention will be described with reference to FIGS. 1 through 5.

Figure 3:
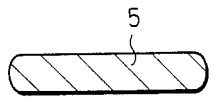
FIG. 3 is a cross-sectional view of a spoke of the steering wheel of FIG. 1.

The steering wheel includes a column 1 of an automobile body and a steering shaft 2 extending through the column 1. A boss 3 is fastened by a nut 4 to an end of the steering shaft 2. A single spoke 5 extends radially outwardly from a proximal end of the boss 3 and has round edge corners as shown in FIG. 3. A steering ring 6 is supported on the spoke 5. A pad 7 is relatively rotatably mounted by a bearing 8 on a distal end of the boss 3 and supports on a front wall thereof various switches 9 for a horn, a radio receiver, a headlight, a cruise control, and others. A circuit board 10 is housed in the pad 10 and electrically connected to the switches 9.

Figure 1:
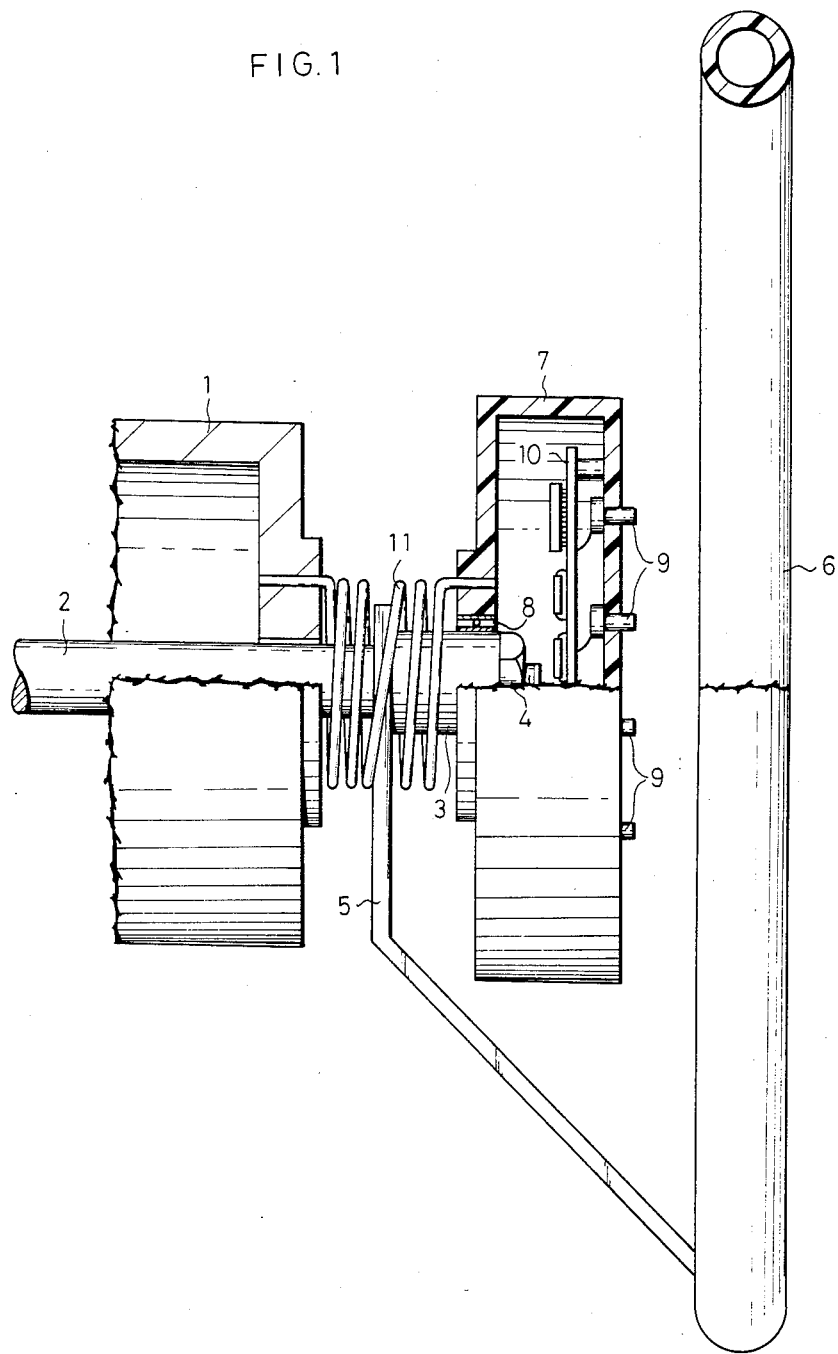
FIG. 1 is a side elevational view, partly in cross section, of a steering wheel according to a first embodiment of the present invention.
Figure 2:
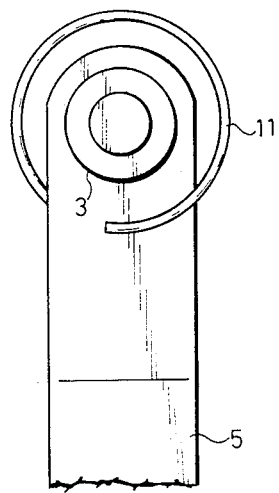
FIG. 2 is a fragmentary front elevational view showing inner parts of the steering wheel of FIG. 1.
Figure 4:
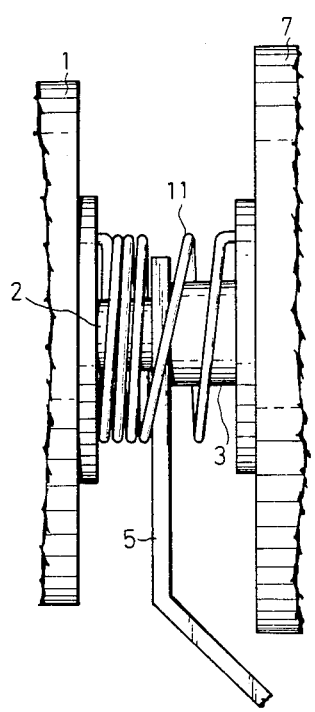
FIGS. 4 and 5 are fragmentary side elevational views illustrative of the manner in which the steering wheel of FIG. 1 operates.
Figure 5:
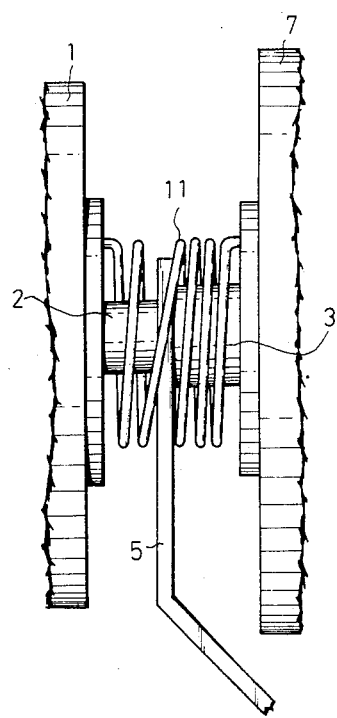

A helical member 11 made of metal or synthetic resin, for example, is disposed between the column 1 and the pad 7. The helical member 11 has one end fixed to the column 1 and is disposed around the steering shaft 2 and the boss 3 in slightly spaced relation thereto. The helical member 11 has a number of turns which is one or two greater than the maximum number of rotations of the steering wheel, the turns being loosely wound around the steering shaft 2 and the boss 3. The other end of the helical member 11 is fixed to the pad 7. As illustrated in FIGS. 1 and 2, the helical member 11 has a central portion coiled across the spoke 5 when the steering wheel is in a neutral condition (or the automobile is running straight). The spoke 5 thus radially outwardly projects between adjacent two turns of the helical member 11. As illustrated in FIGS. 4 and 5, the helical member 11 is resiliently extensible and contractable in axial directions, but is not substantially extensible and contractable in the direction in which it is wound, with the opposite ends kept untwisted with respect to each other.

Operation of the steering wheel thus constructed is as follows:

When the steering ring 6 is turned for steering the automobile, the boss 3 and the spoke 5 are angularly moved while held immovable axially. The spoke 5 is angularly moved as it is forcibly slid between turns of the helical member 11. More specifically, when the steering ring 6 is turned clockwise (as the steering ring 6 is seen head on) from the neutral position, the spoke 5 pushes the helical member 11 toward the column 1 as shown in FIG. 4. When the steering ring 6 is turned counterclockwise, the spoke 5 pushes the helical member 11 toward the pad 7 (FIG. 5).

Therefore, the spoke 5 is not prevented by the helical member 11 from being turned. Any frictional resistance by the helical member 11 to the rotation of the spoke 5 is reduced since the edge corners of the spoke 5 are round.

Since the opposite ends of the helical member 11 are kept untwisted, as described above, the pad 7 is supported by the helical member 11 against rotation with respect to the column 1.

Accordingly, the pad 7 is held nonrotatable by a mechanism composed of a reduced number of parts and having a simple construction. The steering wheel can therefore be assembled with ease and manufactured at a reduced cost. The pad 7 will not be subjected to wobbling or backlashes because there are not employed gears which suffer backlashes and other problems, and the pad 7 and the column 1 are interconnected by the helical member 11.

Figure 6:
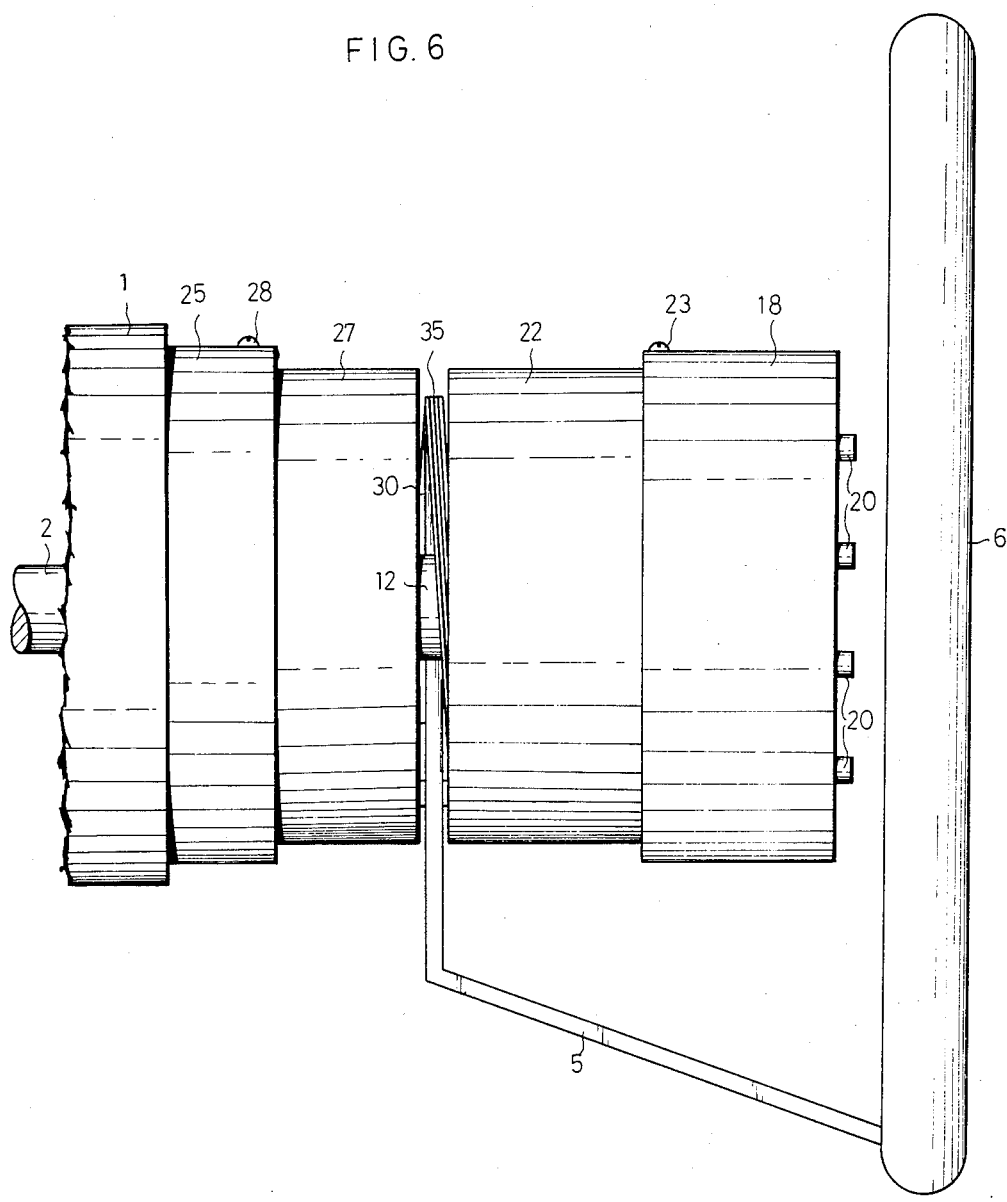
FIG. 6 is a side elevational view of a steering wheel according to a second embodiment of the present invention.
Figure 7:
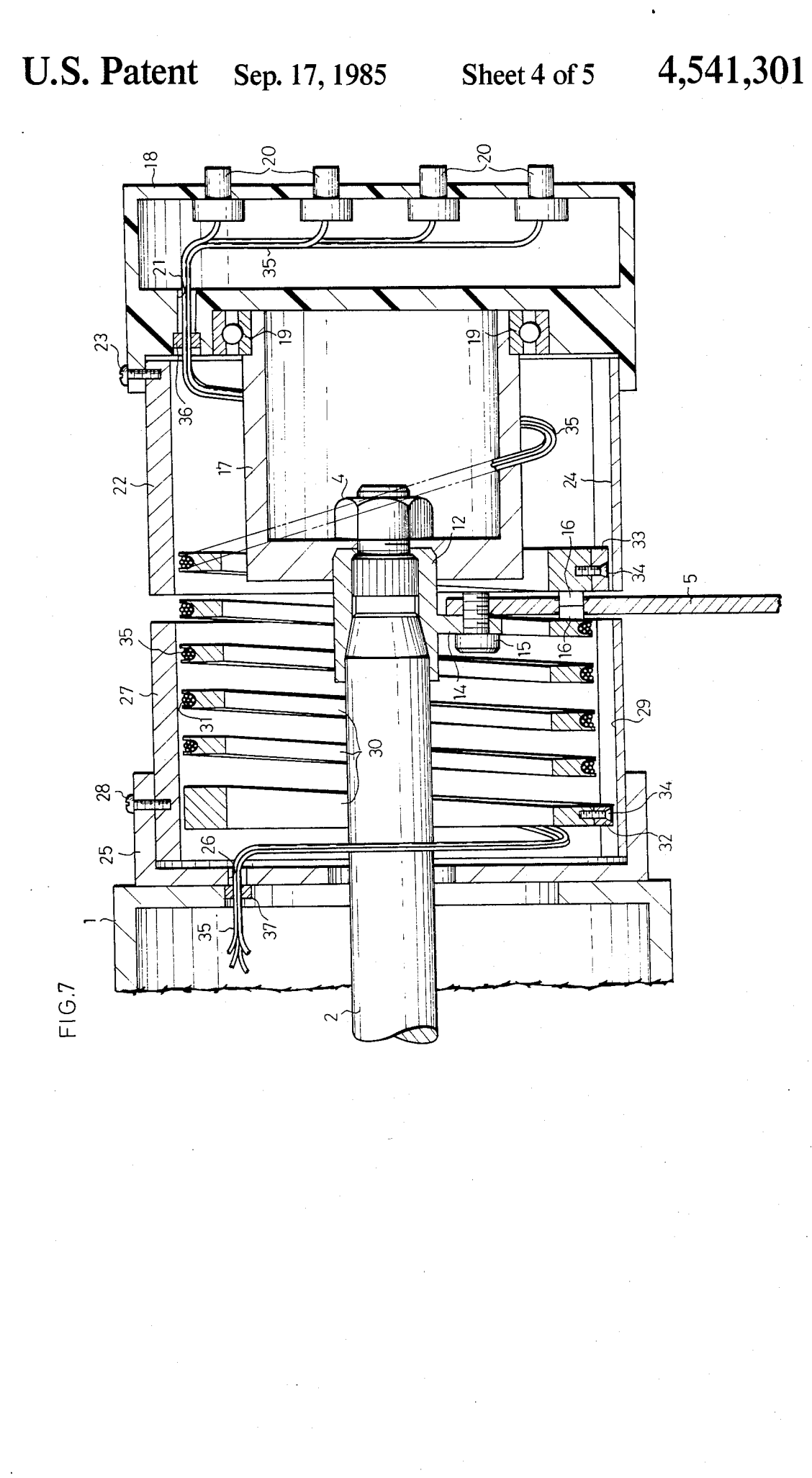
Figure 8:
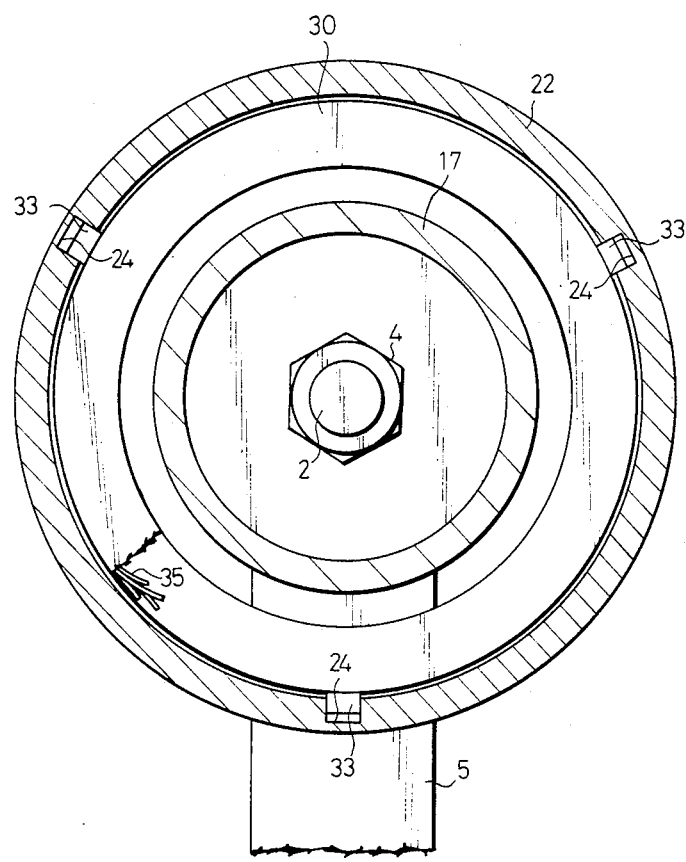
FIG. 8 is a transverse cross-sectional view of a guide member and a helical member of the steering wheel of FIG. 6, which are held in engagement with each other.

FIGS. 6 through 8 illustrate a steering wheel according to a second embodiment of the present invention. The steering wheel of the second embodiment is different from that of the first embodiment in that the helical member is not extensible and constractable, but slidable in axial directions.

A boss 12 is fastened by a nut 4 to an end of a steering shaft 2. A spoke 5 is secured by a nut 15 to a radially projecting flange 14 of the boss 12. A pair of rollers 16 is mounted on the spoke 5 adjacent to a proximal end thereof and extends longitudinally of the spoke 5. The rollers 16 are rotatably supported on the spoke 5 and have portions slightly projecting beyond front and rear surfaces of the spoke 5.

A cylindrical member 17 is affixed to a distal end of the boss 12 and extends axially away from the steering shaft 2. A pad 18 is relatively rotatably mounted by a bearing 19 on the outer periphery of a distal end of the cylindrical member 17. The pad 18 supports on its front surface various switches 20 for a horn, a radio receiver, a headlight, a cruise control, a radio communication system, and others. The pad 18 has a through hole 21 defined axially through a rear wall thereof. A cylindrical guide member 22 is secured by a bolt 23 to a rear end of the pad 18 and has a rear end extending axially to a position near the spoke 5. The cylindrical guide member 22 has three axial guide slots 24 defined in an inner peripheral surface thereof and angularly spaced at angular intervals of 120°.

A short cylindrical bracket 25 is attached to the column 1 and has a through hole 26 defined axially through a bottom thereof. A cylindrical guide member 27 is secured at an end thereof by a bolt 28 to an inner peripheral surface of the bracket 25, the cylindrical guide member 27 having a front end extending axially to a position near the spoke 5. The cylindrical guide member 27 on the column 1 is positioned coaxially with the cylindrical guide member 22 on the pad 18. The cylindrical guide member has three axial guide slots 29 defined in an inner peripheral surface thereof and angularly spaced at angular intervals of 120°. The guide slots 29 and the guide slots 24 extend in axial alignment with each other with a small clearance therebetween.

A helical member 30 made of metal or synthetic resin, for example, and having a rectangular cross section is disposed in the guide members 22, 27, and has has a number of turns which is one or two greater than the maximum number of rotations of the steering wheel, the turns being loosely wound. The helical member 30 has a continuous groove 31 defined in an outer peripheral surface thereof. Sliders 32, 33 are secured by bolts 34 to the outer peripheral surfaces of ends of the helical member 30 which are adjacent to the column 1 and the pad 18, the sliders 32, 33 being formed of oleoresin such as oil-impregnated polyacetal. There are three sliders 32 and three sliders 33 mounted at angular intervals of 120° on the end of the helical member 30 and slidably fitted in the guide slots 24, 29. The helical member 30 has a central portion coiled across the spoke 5 when the steering wheel is in a neutral position. The spoke 5 angularly movably projects radially outwardly between adjacent turns of the helical member 30 with the rollers 16 held in rolling contact with the confronting surfaces of the turns. The helical member 30 is not substantially extensible and contractable in axial directions and also in the direction in which the helical member 30 is wound. The helical member 30 is axially slidable along the guide slots 24, 29 without being turned about their own axes within the guide members 22, 27.

Bundled connector cables 35 have cable ends connected to the switches 20 and comprise ordinary covered wire cables. The connector cables 35 extend through the hole 21 in the pad 18 and are secured to the pad 18 by a retainer 36. The connector cables 35 are loosely coiled as about one turn around the cylindrical member 17, and fully accommodated in the groove 31 in the outer peripheral surface of the helical member 30. The connector cables 35 as they leave the end of the helical member 30 adjacent to the column 1 are loosely coiled as about one turn around the steering shaft 2, and extend through the hole 26 in the bracket 25. The connector cables 35 are secured to the bracket 25 by a retainer 37, and extend through the column 1 and are connected to the various devices such as the horn and others as described above.

The steering wheel of the second embodiment thus constructed will operate as follows:

When the spoke 5 is turned during steering operation, the rollers 16 roll in contact with the helical member 30, which is moved axially by being pushed by the spoke 5 without being turned about its own axis.

Therefore, the turning movement of the spoke 5 is not prevented by the helical member 30. Since the helical member 30 is in contact with the spoke 5 through the rollers 16, any frictional resistance to the angular movement of the spoke 5 is small.

Because the helical member 30 is not extensible and contractable in the winding direction thereof, and the sliders 32, 33 remain in the same relative positions, the guide member 22 in which the slider 33 is fitted and the pad 18 bolted to the guide member 22 are prevented from being angularly moved with respect to the column 1.

As the helical member 30 is axially moved, the portion of the connector cables 35 which is wound on the helical member 30 is also axially moved therewith without contacting the spoke 5 and the guide members 22, 27. Therefore, such portion of the connector cables 35 does not prevent the angular movement of the spoke 5 and is not damaged by the spoke 5 and the guide members 22, 27. Those portions of the connector cables 35 which are positioned between the helical member 30 and the pad 18 and the bracket 25 are loosely coils as the respective one turns, they can easily be extended or contracted axially without suffering from an undue tension.

The steering wheel of the second embodiment therefore has the same advantages as those of the steering wheel of the first embodiment. With the second embodiment, furthermore, the pad 18 even under an external force applied by the driver or the like is prevented from swinging or wobbling since the sliders 32, 33 are fitted in the guide slots 29, 24. As a consequence, the driver does not feel uneasy about the pad 18 or the high-grade quality of the steering wheel is not impaired. Electric signals from the swiches 20 on the pad 18 are reliably transmitted over the connector cables 35 to the devices such as the horn and others. The connector cables 35 may comprise ordinary inexpensive covered wire cables, and can easily be attached simply by placing the same in the groove 31 in the outer peripheral surface of the helical member 30, resulting in a reduction in the cost of manufacture of the steering wheel.

As no special installation space is required for installing the connector cables 35 serving as an electric connector mechanism, the steering wheel will not be increased in size by the connector cables 35.

The steering wheel according to the second embodiment may be changed or modified as follows:

(1) The helical member 30 may have a guide slot in an outer periphery thereof, and the guide members 22, 27 may have sliders on inner peripheral surfaces thereof which are fitted in the guide slot in the helical member 30.

(2) The number of sliders 32, 33 may be varied, and the sliders 32, 33 may be attached to the helical members 30 in different positions.

(3) Instead of or in addition to the groove 31, a groove may be defined in an inner peripheral surface of the helical member 30 with connector cables 35 placed in that groove.

(4) The connector cables 35 may be embedded in the helical member 30.

(5) A circuit for multiplexing the signals from the switches 20 may be disposed in the pad 18 thereby to reduce the number of connector cables 35.

The steering wheel according to the present invention has the following advantages:

Since the steering wheel of the invention is constructed of a reduced number of parts and simple in structure, it can easily be assembled and manufactured at a lower cost. The pad is substantially free from wobbling or backlashes. Because the pad is reliably prevented from swinging or wobbling when subjected to an external force applied, the driver does not feel uneasy about the pad or the high-grade quality of the steering wheel is not lowered. With the connector cables leading to an integrated switch circuit or the like in the pad and disposed peripheraly on the helical member, the electric connector mechanism between the pad and the column is simplified in construction and can easily be attached in place, with the consequence that the electric connector mechanism is constructed less costly. The overall steering wheel is prevented from being increased in size due to the electric connector mechanism as there is no substantial installation space for the electric connector mechanism.

Although certain preferred embodiments have been shown and described, it should be understood that many changes and modifications may be made therein without departing from the scope of the appended claims.

What is claimed is:

1. A steering wheel comprising:
   (a) a column;
   (b) a steering shaft extending through said column;
   (c) a spoke mounted on said steering shaft;
   (d) a steering ring supported on said spoke;
   (e) a pad mounted on said steering shaft in front of said spoke; and
   (f) a helical member interconnecting said pad and said column to fix said pad nonrotatably with respect to said column and helically coiled as a number of turns which is greater than the maximum number of rotations of said steering ring, said helical member having a portion extending across said spoke.

2. A steering wheel according to claim 1, wherein said helical member is resiliently extensible and contractable in axial directions and has opposite ends fixed to said column and said pad, respectively.

3. A steering wheel according to claim 1, wherein said helical member is nonrotatable and not substantially extensible and contractable in axial directions and in a direction in which said helical member is wound, said helical member being movable by said spoke in the axial directions.

4. A steering wheel according to claim 3, including a connector cable extending along said helical member for transmitting an electric signal between said pad and said column, said pad having at least one switch disposed on a front surface thereof for actuating an electric device.

5. A steering wheel according to claim 4, wherein said helical member has a groove defined in a peripheral surface thereof and accommodating the connector cable therein.

6. A steering wheel according to claim 3, including a pair of coaxial cylindrical guide members having ends fixed to said column and said pad, respectively, and opposite ends disposed adjacent to said spoke, said helical member being disposed in said cylindrical guide members.

7. A steering wheel according to claim 6, wherein each of said cylindrical guide members have at least one axial guide slot defined in an inner peripheral surface thereof, said helical member having a pair of sliders on an outer peripheral surface which are fitted in and slidable along the axial guide slots, respectively, in said cylindrical guide members.

* * * * *